Jan. 18, 1966  W. E. BINKLEY  3,229,406
FISHING ROD AND REEL
Filed July 27, 1964  2 Sheets-Sheet 1
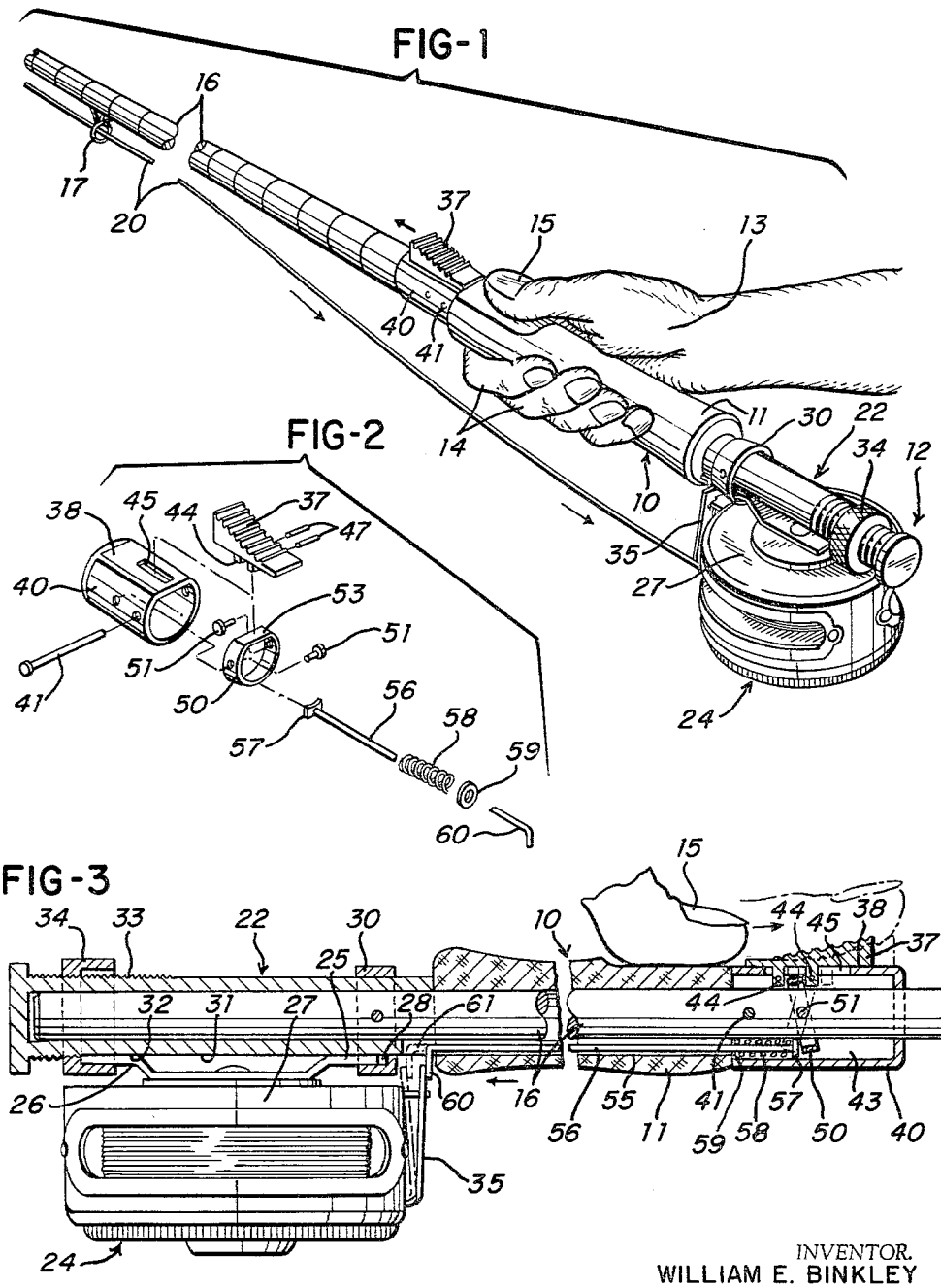
INVENTOR.
WILLIAM E. BINKLEY
BY
Marechal, Biebel, French & Bugg
ATTORNEYS Jan. 18, 1966 W. E. BINKLEY 3,229,406
FISHING ROD AND REEL
Filed July 27, 1964 2 Sheets-Sheet 2
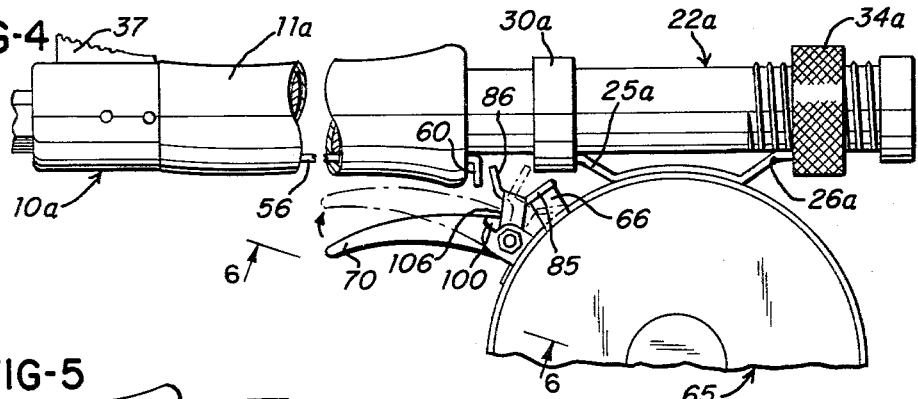
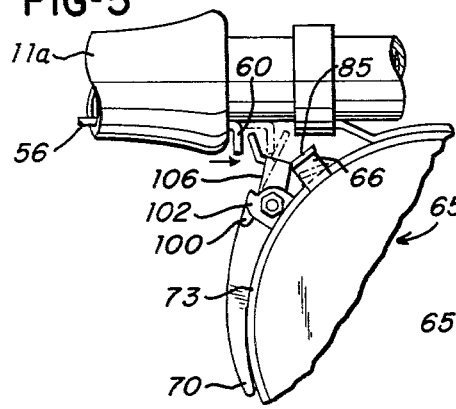
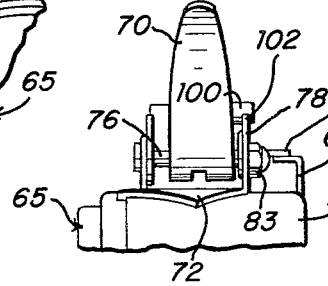
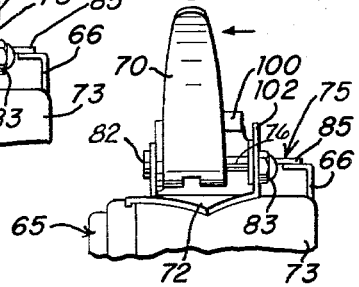
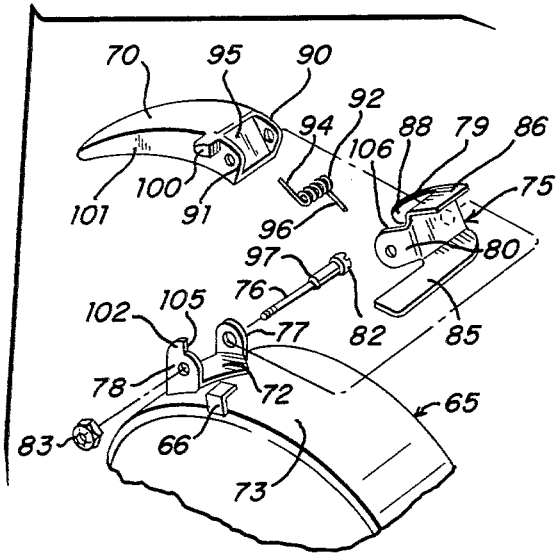
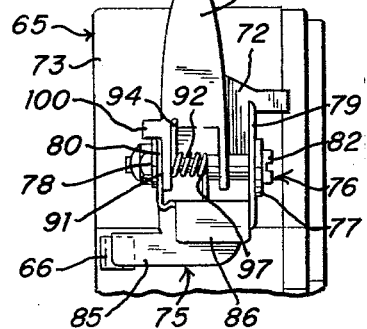
INVENTOR.
WILLIAM E. BINKLEY
BY
Marechal, Biebel, French & Bugg
ATTORNEYS United States Patent Office 3,229,406
Patented Jan. 18, 1966

3,229,406
FISHING ROD AND REEL
William E. Binkley, P.O. Box 127, Greenville, Ohio
Filed July 27, 1964, Ser. No. 385,210
9 Claims. (Cl. 43—21)

This invention relates to the art of fly fishing, and more particularly to apparatus for facilitating the manual operation of the fly reel.

The conventional fly fishing rod has an elongated grip or handle approximately eight inches in length secured near one end of a long thin flexible rod, often eight to ten feet long. The fly reel is releasably secured in place on the butt of the rod adjacent the handle, and the rod is normally gripped by the skilled and experienced fisherman near the forward end of the handle since this point is closer to the center of gravity which lies somewhere ahead of the handle. Specifically, the handle is gripped by placing the four fingers of one hand around the under side of the forward end of the handle and using the thumb of the hand to apply pressure to the top of the handle to "drive" the rod, that is, to effect vertical movement of the rod to play out the line, and then to impart a jerking motion to the leader and fly on the end of the line to attract fish.

To reel in the line it is necessary to depress a brake release on the fly reel so that the coiled spring in the reel will wind in the line, and this requires that the fisherman place the butt end of the rod against his hip while he slides his hand backwardly on the handle to a position wherein his little finger can operate the brake release. After a fish has taken the fly, it is often necessary to fight with the fish for several minutes and this generally involves keeping tension on the line regardless of the action of the fish. The tension is maintained by grasping the line as it extends from the reel with the free hand and manually playing the fish.

During this period the line will be alternatively reeled in and played out, and the reeling in operation is complicated by the gripping of the rod near the reel end of the handle wherein it is difficult to control the rod by one hand. In face, the handle must be held immediately adjacent the reel during this time so that the little finger can operate the brake, which causes cramping and muscle fatigue in the little finger and the thumb which must balance the rod. Some attempts have been made to operate the brake release from a remote position but have not been satisfactory since they also cause muscle cramping and fatigue, and are difficult to operate.

Accordingly, an important object of my invention is to provide a fly fishing rod wherein the brake release of the reel can be operated with ease while the rod is grasped at the forward end of the handle grip.

Another object of the invention is to provide a fishing rod which is adapted to releasably receive a plurality of different fly casting reels and which remotely operates the brake release on these reels by a simple forward movement thumb action, and more particularly to provide structure of the aforesaid type which is simple in construction for maximum dependability and decreased cost.

A further object of the invention is to provide a mechanism for remotely operating the brake release of a casting reel which requires only minor modification of the brake release structure, and to further provide a mechanism of this type which alternately permits the brake release to be operated by the little finger in the conventional manner.

Other objects and advantages of this invention will be apparent from the following description, the accompanying drawings and the appended claims.

In the drawings:

FIG. 1 is a perspective view showing the fly rod being held in operative position;

FIG. 2 is an exploded view of the components of the reel actuating mechanism;

FIG. 3 is a longitudinal sectional view through the handle end of the rod;

FIG. 4 is a side elevation view of another embodiment of the invention;

FIG. 5 is an enlarged side elevation view showing the trigger in a retracted position;

FIG. 6 is a side view taken along the view line 6—6 of FIG. 4;

FIG. 7 is a view similar to FIG. 6 but showing the trigger moved to the left;

FIG. 8 is an exploded view of the embodiment shown in FIG. 5; and

FIG. 9 is a side elevation view of the brake actuating mechanism as shown in FIG. 5.

Referring now to the drawings wherein preferred embodiments of the invention are shown, FIG. 1 shows a fishing rod assembly 10 of the type used for fly fishing and including a handle 11 near the butt end 12 of the rod adapted to be gripped by the hand 13 with the four fingers 14 extending around the lower side of the handle 11 and with the thumb 15 on top thereof for driving the rod 10 in the usual manner. The elongated flexible rod 16 extends through the handle 11 and has the eyelets 17 thereon for guiding the line 20 along the rod in the usual manner.

The butt section 22 of the rod assembly 10 is located on the rod 16 at the opposite end of the handle 11, and the fly reel 24 is releasably secured thereto. The reel 24 has the spaced fingers 25 and 26 secured to the body 27 thereof and one of these fingers 25 is inserted in the notch 28 formed between the rigid ring 30 and outer surface 31 of the butt section 22, as shown in FIG. 3. The other finger 26 is placed against an area 32 which is cleared of threads 33, and then the internally threaded ring 34 is advanced into a clamping position by turning it to effect advancement into a clamping position by turning it to effect advancement along the threads 33 to lock the reel 24 in place on the rod assembly, in a substantially conventional manner.

As is conventional in fly reels, the unwinding of the line 20 winds a spring within the reel 24, and this spring will wind up the line when a brake is released. An elongated brake release lever 35 is thus provided on one side of the reel 24 in a position to be actuated by the little finger when the hand 13 is moved rearwardly on the handle 11. When this lever is moved to the left, as viewed in FIG. 3, the brake mechanism is released so that the line is automatically reeled in.

In accordance with this invention, a mechanism for conveniently operating the brake release lever 35 from the top and front end of the handle 11 is provided, as shown in FIGS. 2 and 3. This mechanism includes a thumb slide 37 which reciprocates on the flattened surface 38 on the collar 40 which surrounds the rod 16 and is secured thereto adjacent the forward end of the handle 11 by the pin 41. This collar has an outer diameter similar to the adjacent handle 11, and an inner diameter which permits sufficient space 43 for the actuating mechanism, as will be seen. The thumb slide 37 has a pair of downwardly extending lugs 44 which extend through a narrow slot 45 in the collar 40 and the small pins 47 are inserted through these lugs inside the collar 40 and transverse to the length of the slot 45 to hold the slide 37 in place for reciprocable movement.

An important part of the invention resides in the swivel ring 50 which is pivotally secured in the space 43 around the rod 16 by the small pins or rivets 51, as shown in FIGS. 2 and 3. This ring conforms to the shape of the collar 40 and thus has a flat top portion 53 on the top thereof for clearance with the surface 38 of the collar 40, and the ring 50 has also sufficient clearance around the rod 16 to permit a rocking motion. The top portion 53 of this ring fits snugly between the lugs 44 so that reciprocation of the thumb slide 37 effects controlled angular movement of the swivel ring 50.

Mounted below the rod 16 in an elongated groove 55 (FIG. 3) cut in the cork handle 11 is an actuator 56 which has a curved contact plate 57 on one end thereof in contact with the bottom of the swivel ring 50. A spring 58 is interposed between the washer 59 disposed adjacent the handle 11 at the entrance of the groove 55 and the plate 57, to thus urge the actuator rod 56 and the plate 57 to the right, as viewed in FIG. 3, and effect counterclockwise rotation of the swivel ring 50 and leftward movement of the thumb slide 37 to a normal inactive position. The other end of the actuator rod 56 has an L-shaped extension 60 thereon which extends through the slot 61 in the butt section 22 and contacts the brake release lever 35, as seen in FIG. 3. The location of the ring 30 is thus important since it locates the forward position of the reel 24 on the butt section 22 so that the extension 60 contacts the brake release lever 35.

In operation, the rod assembly 10 is grasped near the forward end of the handle 11 in the manner shown in FIG. 1 so that it is quite easy for the fisherman to move the fishing rod in any direction. When a fish is caught, the line 20 is normally grasped by the free hand and pulled in in order to maintain the necessary tension when fighting a fish. When slack exists in the line and the fisherman desires to reel this slack in, he merely advances his thumb slightly and pushes the slide 37 forward on the collar 40 in a convenient manner thus effecting pivotal movement of the swivel ring 50 against the bias of the spring 58. This movement of the actuator rod 56 to the left as viewed in FIG. 3, and the extension 60 moves the brake release lever 35 to the left to release the brake so that the reel commences to wind in the line 20.

When the thumb slide 37 is released, the spring 58 returns the actuator rod 56, the swivel ring 50 and the thumb actuator 37 to their normal positions to return the brake release lever 35 to its normal position wherein the reeling in operation is terminated. Thus the fisherman is able to operate the brake release lever 35 without moving his hand from the forward portion of the handle 11 by a simple and natural forward motion of the thumb. In this connection, the forward motion of the thumb slide 37 is important since it would be quite tiring and unwieldy to repeatedly move the thumb actuator 37 in the opposite direction. This action is also highly advantageous when it is necessary, for long periods of time, to hold the reel brake released while the free hand of the fisherman snubs outgoing line and brings in line to maintain a tight line while subduing a fighting fish. It will also be noted that the lever 35 can also be operated by the little finger if desired by sliding the hand to the rear end of the handle 11.

Another embodiment of the invention is shown in FIGS. 5–9 wherein the remote brake release mechanism in the rod assembly 10a is identical to that described above. The main difference in this embodiment is the use of another type of fly reel 65 which has its axis horizontal rather than vertical. The fingers 25a and 26a of the reel 65 are secured to the butt section 22a by the rings 30a and 34a in the manner described above, and the reel 65 uses a brake release button 66 located near one edge of the reel in close proximity to the rear of the handle 11a, as seen in FIGS. 6 and 7.

The reel 65 has a retractible trigger 70 which can also be used to operate the release button 66 when it is not desired to use the thumb slide 37. During operation of the brake by the thumb slide 37, or if the reel is being stored, the trigger 70 is retracted to the position shown in FIG. 5.

The brake release structure includes a U-shaped bracket 72 secured to the reel housing 73, and a pivot member 75 which is secured thereon by inserting the pin 76 through the openings in the ears 77 and 78 on the bracket 72 and 79 and 80 on the member 75. The pin 76 had a head 82 on one end and the other end is threaded to receive the nut 83, but it is within the scope of the invention to use other equivalent fastening means.

The elongated finger 85 extends parallel to the pin 76 from the central portion of the member 75 for contacting and depressing the brake button 66 when the member is rotated by the engagement between the extension 60 of the rod 56 with the upstanding plate 86 on the member 75, as seen in FIG. 5. The projection 88 on the ear 80 contacts the reel housing 73 and limits rotation of the member 75 in a counterclockwise direction so that the finger 85 is always positioned closely to the button 66.

On the other hand, the member 75 can be rotated and the button 66 depressed by operation of the trigger 70 which is moved to a retracted position when not in use. The trigger has the extended sides 90 and 91 thereon with openings therein mounted on the pins 76 between the ears 79 and 80 on the member 75, as seen in FIG. 9. A coil spring 92 also surrounds the pin 76 between the sides 90 and 91, and and has one end 94 bearing against the surface 95 on the trigger 70 and the other end 96 bearing against the reel housing 73 in such a manner that the trigger 70 is continually urged toward the retracted position.

The spring 92 is interposed between the shoulder 97 formed on the pin 76 and the side 91 of the trigger (see FIG. 9) to urge the trigger 70 to the left against the ears 78 and 80. To move the trigger into an operating position, it is necessary to move it to the right as viewed in FIG. 9 or to the left as viewed in FIG. 7, against the bias of the spring 92 to permit the lug 100 on the side 101 of the trigger 70 to clear the projection 102 on the ear 78 which normally prevents movement of the trigger into operative position. Once the lug 100 clears the projection 102, the trigger 70 can be pivoted in a clockwise direction as viewed in FIGS. 4 and 5 until the lug 100 clears the projection 102 and engages the other edge 105 of this projection. As the trigger is moved an additional amount in the clockwise direction, the lug 100 thereon engages the edge 106 of the ear 80 and pivots the member 75 in a clockwise direction thus causing the finger 85 to depress the button 66 and release the brake. The spring 92 is tensioned during assembly and thus provides a bias to hold the trigger 70 in both the extended and retracted position.

The embodiment in FIGS. 4–9 can also be operated from the forward end of the handle 11a by the thumb slide 37 in substantially the same manner described above. In other words, forward movement of the thumb slide 37 moves the rod 56 to the right as viewed in FIG. 4 thus moving the extension 60 in the same direction to apply a force to the plate 86. This effects movement of the member 75 in a clockwise direction and causes the finger 85 to depress the brake release button 66 so that the reel 65 will wind in the line.

If it is desired to use the trigger 70 to operate the brake release, the trigger 70 is moved from the retracted position shown in FIG. 5 by moving it in a leftward direction as shown in FIGS. 5 and 6 until the lug 100 engages the edge 105 of the extension 102 on the ear 78. In this position the trigger is disposed as shown in FIG. 4, and upward movement of the trigger by the little finger causes the lug 100 to engage the edge 106 of the ear 80 to rotate the member 75 in a clockwise direction to depress the brake release button 66. The thumb slide 37 can also be used to operate the brake release when the trigger 70 is in its operative position. When the trigger 70 is released, the spring 92 moves it in a counterclockwise direction until the lug 100 again engages the edge 105 to prohibit further counterclockwise movement thereof.

To move the trigger to its retracted position, it is merely necessary to slide it to the left as viewed in FIGS. 6 and 7 against the bias of the spring 92 so that the lug 100 clears the extension 102 so that the trigger can pivot in a counterclockwise direction until it engages the housing 73 of the reel 65 as shown in FIG. 5.

The invention has thus provided a mechanism for operating the brake release of a fly reel from a remote position on the top side and forward end of the handle by use of a convenient forward movement of the thumb. The mechanism can be used to operate the brake releases on more than one type of reel, and it is understood that the extension 60 could be modified to operate other types of brake release mechanisms on fly reels. Moreover, the invention permits the continued use of the conventional brake release mechanisms which require only minor modification to be adapted for use with the remote actuating mechanism of the invention. The mechanism is simple and rugged for decreased cost and increased dependability, and the major portion of this mechanism is enclosed within the rod so that it cannot be damaged.

While the forms of apparatus herein described constitute preferred embodiments of this invention, it is to be understood that this invention is not limited to these precise forms of apparatus, and that changes may be made therein without departing from the scope of the invention which is defined in the appended claims.

What is claimed is:

1. A fishing rod assembly of the character described for use with a fly reel having a brake release lever, comprising handle means on said rod, means for releasably securing the reel to said rod adjacent the handle means, a reciprocating thumb actuator on the top side and forward end of said handle means, a swivel ring surrounding said rod and mounted for pivotal movement on a horizontal axis perpendicular to the axis of the rod, means to engage the top of said swivel ring with said thumb actuator so that movement of said actuator effects pivotal movement of said swivel ring, an actuator rod having one end adapted to engage the bottom of said swivel ring, said actuator rod having means on the other end thereof for engaging the brake lever so that the brake is released when said thumb actuator is moved in a forward direction on said handle means away from said reel, and means urging said thumb actuator in a direction opposite said forward direction to position said actuator rod normally in an inactive position.

2. A fishing rod assembly of the character described for use with a fly reel having a brake release, comprising an elongated rod, a handle surrounding said rod near one end thereof, means for releasably securing the reel to the butt end of said rod adjacent said handle, a collar surrounding said rod adjacent the forward end of said handle for defining an annular space between said collar and said rod, a slot in the top of said collar parallel to the axis of said rod, a thumb slide reciprocally mounted in said slot on the top side of said collar, a swivel ring surrounding said rod in said space and mounted for pivotal movement on a horizontal axis perpendicular to the axis of the rod, means for connecting the top of said swivel ring to said thumb slide so that movement of said thumb slide effects pivotal movement of said swivel ring, an actuator rod having one end associated with the bottom of said swivel ring, said actuator rod having means on the other end thereof for engaging the brake release so that the brake is released when said thumb slide is moved in a forward direction on said collar away from the reel, and means urging said actuator rod in a forward direction to position said actuator rod, said swivel ring, and said thumb slide normally in an inactive position.

3. A fishing rod assembly of the character described for use with a fly reel having a brake release, comprising a rod, handle means surrounding said rod near one end thereof, means for releasably securing the reel to the butt end of said rod adjacent said handle means, a thumb actuator reciprocally mounted on said handle means on the top side thereof, a swivel ring surrounding said rod and mounted for pivotal movement, means for connecting the top of said swivel ring to said thumb actuator so that movement of said thumb actuator effects pivotal movement of said swivel ring, actuator means associated with the bottom of said swivel ring, said actuator means also associated with said brake release so that the brake is released when said thumb actuator is moved in a forward direction on said handle means away from the reel, and means urging said actuator means in a forward direction to position said actuator means normally in an inactive position.

4. A fishing rod assembly of the character described for use with a fly reel having a brake release, comprising an elongated rod, handle means surrounding said rod near one end thereof, means for releasably securing the reel to the butt end of said rod adjacent said handle means, a thumb slide reciprocally mounted on said handle means on the top side thereof, a lever in said handle means mounted for pivotal movement on a horizontal axis perpendicular to the axis of the rod, means connecting the top of said lever to said thumb slide so that movement of said slide effects pivotal movement of said lever, actuator means operably interconnecting the bottom of said lever and the brake release so that the brake is released when said thumb slide is moved in a forward direction on said handle means away from the reel, and means urging said actuator means in a forward direction to position said actuator means normally in an inactive position.

5. A fishing rod assembly including a rod having a fly reel releasably secured adjacent the handle thereof comprising, a brake release button on the reel in close proximity to the handle, an actuator member on said reel for pivotal movement to a first position wherein it engages said release button to release the brake and to a second position wherein said brake release button is in its normal position, a reciprocating thumb actuator on the top side and forward end of said handle, lever means mounted in said handle for pivotal movement, means connecting one end of said lever means to said thumb actuator so that movement of said thumb actuator effects pivotal movement of said lever, an elongated rod having one end connected to the other end of said lever means, said elongated rod having means on the other end thereof for engaging and moving said actuator member to said first position so that said brake is released when said thumb actuator is moved in a forward direction away from said reel, and means urging said elongated rod in forward direction to position said elongated rod in an inactive position.

6. A fishing rod assembly including a rod having a fly reel releasably secured adjacent the handle thereof comprising, a brake release means on the said reel in close proximity to the handle, an actuator member on said reel for pivotal movement to a first position wherein it engages said release button to release the brake and to a second position wherein said brake release button is in its normal position, a reciprocating thumb actuator on the top side and forward end of said handle, lever means mounted in said handle for pivotal movement, means connecting one end of said lever means to said thumb actuator so that movement of said thumb actuator effects pivotal movement of said lever, an elongated rod having one end connected to the other end of said lever means, said elongated rod having means on the other end thereof for engaging and moving said actuator member to said first position so that said brake is released when said thumb actuator is moved in a forward direction away from said reel, means urging said elongated rod in a forward direction to position said elongated rod in an inactive position, and a retractable trigger member on said reel for engaging said actuator member for movement to said first position.

7. A fishing rod assembly including a rod having a fly reel releasably secured adjacent the handle thereof comprising, a brake release button on said reel in close proximity to the handle, a bracket on said reel having a pivot pin thereon, an actuator member secured to said pivot pin for pivotal movement on said bracket, a finger on said actuator member aligned with said button and movable with said actuator member to a position wherein said finger engages said release button to release the brake and to a second position wherein said finger provides for movement of said brake release button to its normal position, a trigger mounted on said pin for pivotal movement between a retracted position against the side of said reel and an active position wherein said trigger can move said actuator member to said first position, a reciprocating thumb actuator on the top side and forward end of said handle, lever means mounted in said handle for pivotal movement, means connecting one end of said lever means to said thumb actuator so that movement of said thumb actuator effects pivotal movement of said lever, an elongated rod having one end connected to the other end of said lever means, said elongated rod having means on the other end thereof for engaging and moving said actuator member to said first position so that said brake is released when said thumb actuator is moved in a forward direction away from said reel, and means urging said elongated rod in a forward direction to position said thumb actuator in an inactive position.

8. A fishing rod assembly including a rod having a fly reel releasably secured adjacent the handle thereof comprising, a brake release button on said reel in close proximity to the handle, a bracket on said reel having a pivot pin thereon, an actuator member secured to said pivot pin for pivotal movement on said bracket, a finger on said actuator member aligned with said button and movable with said actuator member to a position wherein said finger engages said release button to release the brake and to a second position wherein said finger provides for movement of said brake release button to its normal position, a trigger mounted on said pin for pivotal movement between a retracted position against the side of said reel and an active position wherein said trigger can move said actuator member to said first position, and reciprocating thumb actuator means on the top side and forward end of said handle for engaging and moving said actuator member to said first position so that said brake is released when said thumb actuator means is actuated.

9. A fishing rod assembly including a rod having a fly reel releasably secured adjacent the handle thereof comprising, a brake release means on said reel in close proximity to the handle, a bracket on said reel having a pivot pin thereon, an actuator member secured to said pivot pin for pivotal movement on said bracket, a finger on said actuator member aligned with said release means and movable with said actuator member to a position wherein said finger engages said release means to release the brake and to a second position wherein said finger provides for movement of said brake release means to its normal position, a trigger mounted on said pin for pivotal movement between a retracted position against the side of said reel and an active position wherein said trigger can move said actuator member to said first position, an upstanding extension on said bracket, a lug on said trigger extending parallel to said pin for engaging said extension to hold said trigger in said active position, said spring means surrounding said pin to urged said trigger against said extension, said trigger being slidable on said pin against said spring so that said lug clears said extension for movement of said trigger between said retracted and active positions, and reciprocating thumb actuator means on the top side and forward end of said handle for engaging and moving said actuator member to said first position so that said brake is released when said thumb actuator means is actuated.

References Cited by the Examiner
UNITED STATES PATENTS 2,283,039  5/1942  Bremiller _____ 43—20 X
2,882,637  4/1959  Tuttle _____ 43—20

SAMUEL KOREN, *Primary Examiner.*

R. L. HOLLISTER, *Asisstant Examiner.*